(12) United States Patent
Kurkure et al.

(10) Patent No.: US 12,124,867 B2
(45) Date of Patent: Oct. 22, 2024

(54) NETWORK FUNCTION PLACEMENT IN vGPU-ENABLED ENVIRONMENTS

(71) Applicant: VMware LLC, Palo Alto, CA (US)

(72) Inventors: Uday Pundalik Kurkure, Palo Alto, CA (US); Sairam Veeraswamy, Bangalore (IN); Hari Sivaraman, Palo Alto, CA (US); Lan Vu, Palo Alto, CA (US); Avinash Kumar Chaurasia, Bangalore (IN)

(73) Assignee: VMware LLC, Palo Alto, CA (US)

( * ) Notice: Subject to any disclaimer, the term of this patent is extended or adjusted under 35 U.S.C. 154(b) by 631 days.

(21) Appl. No.: 17/224,293

(22) Filed: Apr. 7, 2021

(65) Prior Publication Data

US 2022/0237014 A1    Jul. 28, 2022

(30) Foreign Application Priority Data

Jan. 22, 2021    (IN) .............................. 202141003210

(51) Int. Cl.
| | | |
|---|---|---|
| *G06F 9/455* | (2018.01) | |
| *G06F 9/50* | (2006.01) | |
| *G06T 1/20* | (2006.01) | |

(52) U.S. Cl.
CPC ........ *G06F 9/45558* (2013.01); *G06F 9/5077* (2013.01); *G06T 1/20* (2013.01); *G06F 2009/45587* (2013.01); *G06F 2009/45591* (2013.01); *G06F 2009/45595* (2013.01); *G06F 9/5033* (2013.01); *G06F 9/505* (2013.01); *G06F 2209/503* (2013.01); *G06F 2209/509* (2013.01)

(58) Field of Classification Search
CPC .............. G06F 9/45558; G06F 9/5077; G06F 2009/45591; G06F 2009/45595; G06F 2009/45587; G06F 9/5033; G06F 9/505; G06F 2209/502; G06F 2209/503; G06F 2209/509; G06T 1/20
See application file for complete search history.

(56) References Cited

U.S. PATENT DOCUMENTS

| | | | |
|---|---|---|---|
| 10,074,206 B1 * | 9/2018 | Ingegneri .............. | G06F 9/5077 |
| 2017/0132744 A1 * | 5/2017 | Wilt ........................ | G06T 1/20 |
| 2018/0165785 A1 * | 6/2018 | Kurtz ................... | G06F 9/5077 |
| 2018/0247055 A1 * | 8/2018 | Curtis ................... | G06F 21/554 |

(Continued)

OTHER PUBLICATIONS

Chaurasia, Avinash, et al. "Network functions in virtualized GPU environment." International Conference on High Performance Computing Simulation (HPCS). 2020. (Year: 2020).*

(Continued)

*Primary Examiner* — Michael W Ayers
(74) *Attorney, Agent, or Firm* — King Intellectual Asset Management

(57) ABSTRACT

Disclosed are aspects of network function placement in virtual graphics processing unit (vGPU)-enabled environments. In one example a network function request is associated with a network function. A scheduler selects a vGPU-enabled GPU to handle the network function request. The vGPU-enabled GPU is selected in consideration of a network function memory requirement or a network function IO requirement. The network function request is processed using an instance of the network function within a virtual machine that is executed using the selected vGPU-enabled GPU.

20 Claims, 4 Drawing Sheets

(56) References Cited

U.S. PATENT DOCUMENTS

2019/0208553 A1* 7/2019 Chou ................. G06F 9/45558
2021/0103456 A1* 4/2021 Linet .................... G06F 9/5077

OTHER PUBLICATIONS

Chaurasia, Avinash et al. "Network Functions in Virtualized GPU Environment". International Conference on High Performance Computing Simulation (HPCS). Jul. 2020. (Year: 2020).*

Zhu, Andong et al. "Gost: Enabling Efficient Spatio-Temporal GPU Sharing for Network Function Virtualization". 29th Symposium on Quality of Service. 2021 (Year: 2021).*

* cited by examiner

NETWORK FUNCTION PLACEMENT IN vGPU-ENABLED ENVIRONMENTS

RELATED APPLICATIONS

Benefit is claimed under 35 U.S.C. 119(a)-(d) to Foreign Application Serial No. 202141003210 filed in India entitled "NETWORK FUNCTION PLACEMENT IN VGPU-ENABLED ENVIRONMENTS", on Jan. 22, 2021, by VMware, Inc., which is herein incorporated in its entirety by reference for all purposes.

BACKGROUND

Network functions can include firewalls, proxies, Internet Protocol Security (IPSec), Network Intrusion Detection Systems (NIDS), load balancers, WAN accelerators, and other functionalities. Network functions can be traditionally provided using individual hardware boxes that provide the specified functionality. However, network functions can be virtualized and provided using distributed infrastructure, such as hardware devices that execute virtual machines that provide the network functionalities.

For example, a virtual NIDS device could be deployed to protect a network without the consumer having to physically deploy a traditional hardware box for the NIDS network function. Rather, the virtual NIDS device can be provided by executing a virtual machine that is configured for the purpose.

An enterprise can utilize virtualized network functions. However, the cost of network function virtualization can be prohibitive, and can be greater than the dedicated network function hardware. As a result, there is a need for further innovation to improve virtualization of network functions.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to network function placement in virtual graphics processing unit (vGPU) enabled environments. The vGPU-enabled environments or infrastructures can include data centers, cloud computing services, and other computing environments that include vGPU-enabled graphics processing units (GPUs). Network functions such as firewalls, proxies, Internet Protocol Security (IPSec), Network Intrusion Detection Systems (NIDS), load balancers, WAN accelerators, and other functionalities. Network functions can be traditionally provided using individual hardware boxes that provide the specified functionality.

Network functions can also be virtualized and provided using distributed infrastructure such as hardware devices that execute virtual machines that provide the network functionalities without the consumer having to physically deploy a traditional hardware box for the network function. However, the cost of network function virtualization can be prohibitive, and can be greater than the dedicated network function hardware. As a result, there is a need for further innovation to improve virtualization of network functions. The present disclosure describes mechanisms and specific techniques that provide a more efficient network function virtualization infrastructure that places network functions for execution using vGPUs.

Figure 1:
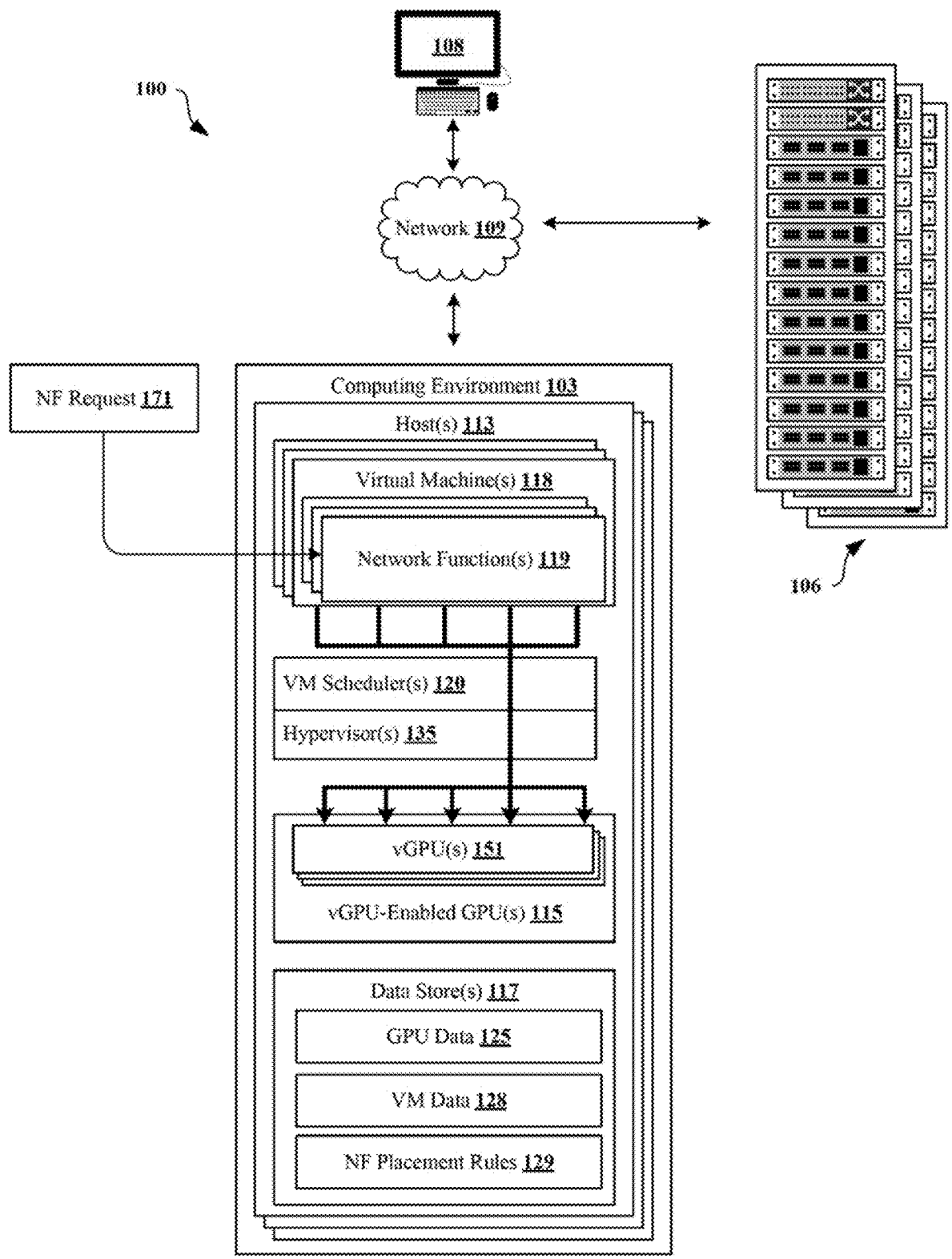
FIG. 1 is a block diagram illustrating an example of a networked environment that includes a computing environment, a client device, and other components in communication over a network.

With reference to FIG. 1, an example of a networked environment 100 is shown. The networked environment 100 can include a computing environment 103, various clusters 106, and one or more client devices 108 in communication with one another over a network 109. The network 109 can include wide area networks (WANs) and local area networks (LANs). These networks can include wired or wireless components, or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks. As the networked environment 100 can serve up virtual desktops to end users, the networked environment 100 can also be described as a virtual desktop infrastructure (VDI) environment.

The computing environment 103 can include hosts 113. The hosts 113 can include processors, GPUs 115, data stores 117, and other hardware resources installed in physical machines of the computing environment 103. In some examples, the computing environment 103 can include an enterprise computing environment that includes hundreds, or even thousands of physical machines, virtual machines, and other software implemented in devices stored in racks, distributed geographically and connected to one another through the network 109. It is understood that any virtual machine or virtual appliance is implemented using at least one physical device.

The computing environment 103 can include, for example, a server or any other system providing computing capability and other hosts 113. Alternatively, the computing environment 103 can include one or more computing devices that are arranged, for example, in one or more server banks, computer banks, clusters, or other arrangements. The computing environment 103 can include a grid computing resource or any other distributed computing arrangement. The computing devices can be located in a single installation or can be distributed among many different geographical locations. Although shown separately from the clusters 106, in some examples, the clusters 106 can be a portion of the computing environment 103. Various applications can be executed on the computing environment 103. For example, a scheduler 120 can be executed by the computing environment 103. Other applications, services, processes, systems, engines, or functionality not discussed in detail herein may also be executed or implemented by the computing environment 103.

The computing environment 103 can include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the clusters 106 and client devices 108 for end users over the network 109, sometimes remotely, the computing environment 103 can be described as a remote computing environment 103 in some examples. Additionally, in some examples, the computing environment 103 can be implemented in hosts of a rack of the computer clusters 106 and can manage operations of a virtualized computing environment.

The GPUs 115 can be vGPU-enabled, or support vGPUs 151. For example, NVIDIA® vGPU solutions can allow multiple virtual machines 118 to share a vGPU-enabled GPU 115 with a balance among performance, security and isolation. Each virtual machine 118 can be assigned to a vGPU 151 of the vGPU-enabled GPU 115. In vGPU mode or mediated pass-through mode, virtual machines 118 time-share the vGPU-enabled GPU 115 resources by time-slicing and hardware preemption based on vGPU-enabled architectures such as the NVIDIA® Pascal architecture. Through the vGPU-enabled architecture, in any given time slice, only one virtual machine 118 runs on a vGPU-enabled GPU 115. All GPU cores of the vGPU-enabled GPU 115 are given to this virtual machine 118 during the time slice, even if it does not use all of the cores.

The GPU internal memory can be statically partitioned based on a vGPU profile. For example, NVIDIA® Tesla P100 16 GB vGPU-enabled GPU 115 can support 1 GB, 2 GB, 4 GB, 8 GB, and 16 GB vGPU profiles. The profiles can equally divide the total GPU memory of the vGPU-enabled GPU 115 into sections or partitions according to the memory size of the vGPU profile. When configured with a 1 GB profile, an NVIDIA® Tesla P100 can support up to 16 virtual machines 118, each provided with 1 GB of the total 16 GB s of the NVIDIA® Tesla P100 vGPU-enabled GPU 115. The NVIDIA® Tesla P100 vGPU-enabled GPU 115 can support up to 8 virtual machines 118 using the 2 GB profile, 4 virtual machines 118 using the 4 GB profile, 2 virtual machines 118 using the 8 GB profile, and a single virtual machine 118 using the 16 GB profile.

An NVIDIA® Tesla P40 24 GB vGPU-enabled GPU 115 can support 1 GB, 2 GB, 3 GB, 4 GB, 6 GB, 8 GB, 12 GB, and 24 GB vGPU profiles. When configured with a 1 GB profile, an NVIDIA® Tesla P40 can support up to 24 virtual machines 118, each provided with 1 GB of the total 24 GB s of the NVIDIA® Tesla P40 vGPU-enabled GPU 115. The NVIDIA® Tesla P40 vGPU-enabled GPU 115 can support up to 12 virtual machines 118 using the 2 GB profile, 8 virtual machines 118 using the 3 GB profile, 6 virtual machines 118 using the 4 GB profile, 4 virtual machines 118 using the 6 GB profile, 2 virtual machines 118 using the 12 GB profile, and a single virtual machine 118 using the 24 GB profile.

A vGPU-enabled GPU 115 can be associated with a vGPU scheduler that resides in the hypervisor 135. The vGPU scheduler can implement various vGPU scheduling policies or vGPU scheduling policies that control how time slices are allocated to the vGPUs 151 of the vGPU-enabled GPU 115. The scheduling policies can include best effort, equal share, and fixed share. In the best effort policy, each virtual machine 118 or workload assigned to vGPUs 151 of a vGPU-enabled GPU 115 can use GPU cycles until its time slice is over or until the job queue is empty. The vGPU scheduler can distribute GPU cycles among all virtual machines 118 that are running CUDA applications using vGPUs. Under some circumstances, a virtual machine 118 running a graphics-intensive application can adversely affect the performance of graphics-light applications running in other virtual machines 118.

For equal share, the amount of cycles given to each vGPU 151 is determined by the current number of virtual machines 118 of a vGPU, regardless of whether these virtual machines 118 are running CUDA or GPU-utilizing applications or not. As a result, the performance of a vGPU 151 may increase as other vGPUs 151 on the same vGPU-enabled GPU 115 are stopped or may decrease as other vGPUs 151 are started on the same vGPU-enabled GPU 115.

For fixed share, the amount of cycles given to each vGPU 151 is determined by the total number of supported virtual machines 118 under the given scheduling policy, regardless if other virtual machines 118 are powered on or not. The vGPU scheduler can be responsible for scheduling vGPUs 151 of that vGPU-enabled GPU 115. As vGPUs 151 are added to or removed from a vGPU-enabled GPU 115, the share of processing cycles allocated to each vGPU 151 remains constant. As a result, the performance of a vGPU 151 remains unchanged as other vGPUs 151 are stopped or started on the same vGPU-enabled GPU 115.

The data store 117 can include memory of the computing environment 103, mass storage resources of the computing environment 103, or any other storage resources on which data can be stored by the computing environment 103. In some examples, the data store 117 can include one or more relational databases, object-oriented databases, hierarchical databases, hash tables or similar key-value data stores, as well as, other data storage applications or data structures. The data stored in the data store 117, for example, can be associated with the operation of the various services or functional entities described below. For example, virtual machines 118, the scheduler 120, GPU data 125, virtual machine data 128, and network function placement rules 129 can be stored in the data store 117.

The scheduler 120 can schedule, assign, or place network functions 119 for implementation in a vGPU-enabled network function virtualization infrastructure provided using the computing environment 103. As a result, the scheduler 120 can be referred to as a network function scheduler. To this end, the scheduler 120 can implement the network functions 119 by scheduling virtual machines 118 to execute in hosts 113, where the virtual machines 118 include instances of the network functions 119, or network function instances.

A network function 119 can refer to instructions that provide firewalls, proxies, Internet Protocol Security (IPSec), Network Intrusion Detection Systems (NIDS), load balancers, WAN accelerators, and other networking functionalities that are traditionally provided using dedicated networking hardware. The network function instructions can be provided by OEM network hardware vendors, can be extracted from dedicated networking hardware, or can be identified from CPU-based implementations of custom or OEM virtualized network functions. The network function instructions can be translated to, or written using, Compute Unified Device Architecture (CUDA) compatible instructions.

The scheduler 120 can place network functions 119 and corresponding virtual machines 118 in view of network function placement rules 129. The network function placement rules 129 can include rules for secure and optimal placement of network functions 119. The network function placement rules 129 can specify that trusted network functions 119, and network functions 119 from a trusted source, can be executed together within a single virtual machine 118. The network function placement rules 129 can specify that untrusted network functions 119, and network functions 119 that are not indicated with a trusted status, can be isolated from trusted network functions 119. In some cases, the network function placement rules 129 can specify that a single untrusted network function 119 is to be executed within its own virtual machine 118 without any other trusted or untrusted network functions 119. If the untrusted network function 119 crashes, or has a security risk, other network functions 119 are unaffected. In other cases, the network function placement rules 129 can specify that an untrusted network function 119 can be executed with other untrusted network functions 119 in a virtual machine 118 that is isolated from, or does not include, trusted network functions 119. While other untrusted network functions 119 can be affected, the trusted network functions 119 can be unaffected.

The network function placement rules 129 can include rules that enable the scheduler 120 to guide the placement of network functions 119 for mixed mode network function placement and scheduling. While some network functions 119 can be input/output (IO)-intensive in nature there are also network functions 119 that have compute-intensive elements that can be offloaded to vGPUs on a chosen node without compromising data locality. The scheduler 120 can reference network function placement rules 129, the GPU data 125, virtual machine data 128, and other information such as geolocation of hosts 113 to place network functions 119 in view of vGPU resource availability, as well as a geolocation where a network stream or packet is sourced from and its IO bandwidth availability. Breaking the locality of the packet source can lead to sub-optimal performance.

The network function placement rules 129 can include rules that enable the scheduler 120 to guide placement of network functions 119 for a pseudo-polymorphic implementation. The scheduler 120 can implement compute intensive network functions 119 in both native CPU-based implementations and vGPU-based implementations. The scheduler 120 can use a combination of data locality (e.g., affinity with a network location or geolocation of the packet source) along with vGPU-resource availability and location to dynamically decide whether to instantiate a native CPU based implementation or use an equivalent vGPU-based function to make sure the effective system utilization is high.

The network function placement rules 129 can also include rules that enable the scheduler 120 to consider vGPU profiles and scheduling policies for network function placement. The IO-intensive nature of some network functions 119 lends itself to leverage a vGPU with a best effort scheduler or an equal share scheduler. This can increase the effective utilization of a GPU and considerably improve the end to end performance of the network functions 119 stack or chain. A chain of network functions 119 can refer to a network function 119 that has an output that feeds into another network function 119.

The network function placement rules 129 can also include rules that enable the scheduler 120 to consider network function chaining. Network function chaining can be considered to minimize the overhead of transferring data by providing additional semantics and context to the vGPU-enabled GPU 115 so that results of one network function 119 is fed back into another network function 119 offload conditionally. GPU offload for network function chaining can include a mechanism in the network function 119 framework wherein additional network function 119 chaining configuration information is provided or fed at runtime. This orchestrator framework in the vGPU-enabled GPU 115 makes use of the context to invoke the next offload code for the next network function 119 to drive processing. This can be used when providing the chaining offload or output from a network function 119 is helpful for the given chain. The chaining offload can minimize the number of copies transferred between native buffers in CPU address space and the network function 119 wrappers running there. In some examples, this allows the scheduler 120 to identify that the output of a network function 119 is another network function 119, which can be referred to as a subsequent network function 119 of a network function chain. The scheduler 120 can execute subsequent network functions 119 of the network function chain on the same vGPU-enabled GPU 115 as the first network function. In some cases, subsequent network functions 119 of the network function chain can be added to the same virtual machine 118. However, in other cases, the subsequent network functions 119 can be scheduled and executed using another virtual machine 118 on the same host 113 and/or the same vGPU-enabled GPU 115. While the same host 113 and/or vGPU-enabled GPU 115 can be selected to reduce data transfer time, the scheduler 120 can also select a different host 113 and/or vGPU-enabled GPU 115 that is associated with a lowest data transfer time among a set of candidates.

The network function placement rules 129 can include or reference a table or other data structure that indicates a set of specific network functions 119 that are associated with a trusted status. The network function placement rules 129 can specify trusted sources such as vendors, developers, or other source entity, such that all network functions 119 from a trusted source are trusted. The scheduler 120 can identify a source of a network function 119 based on a certificate, signature, identifier, or analysis of the code or instructions of the network function 119. The scheduler 120 can also compare the network function 119 to a set of known network functions 119 that are associated with a particular source in a table or other data structure.

The network function placement rules 129 can also include rules for evaluating a network function 119 to have a trusted status. For example, the network function placement rules 129 can include a machine learning algorithm that analyzes CPU usage, network usage, crashes, and other behaviors of the network function 119 and groups the network function 119 with a trusted set of network functions 119. The behaviors can include simulated and live execution of the network function 119 for a predetermined time or predetermined number of transactions. In other cases, the network function placement rules 129 can include threshold values for CPU usage, network usage, crashes, and other behaviors over time. If the network function 119 meets the threshold values, then the scheduler 120 or an analysis service can classify the network function 119 to include a trusted status.

The scheduler 120 can assign or place a virtual machine 118 to be executed using a selected host 113 and vGPU-enabled GPU 115 of the networked environment 100, in consideration of a memory requirement of the virtual machine 118 and a vGPU profile of the vGPU-enabled GPU 115. The memory requirement of the virtual machine 118 can include a sum of the memory requirements of the network functions 119 in that virtual machine 118, and an overhead memory that includes an operating system and other instructions or applications of the virtual machine 118. In some cases, an average or other actual memory usage can be used as the memory requirement for the virtual machine 118. This can account for idle or unused network functions 119 executed therein. In some examples, network functions 119 can be executed to completion and can be removed from the virtual machine 118 thereafter. This can reduce the memory requirement of the virtual machine 118.

The scheduler 120 can assign or place a network function 119 to be executed using a pre-existing or newly added virtual machine 118, on a host 113, and vGPU-enabled GPU 115. The scheduler can place the network function 119 in consideration of is memory requirement, a memory requirement of the network function 119, a trust status (e.g., trusted, untrusted) of the network function 119, a memory requirement of an actual virtual machine 118, and a vGPU profile of the vGPU-enabled GPU 115.

The scheduler 120 can access a table or another data structure that maps GPU profiles to GPU identifiers of GPUs 115.

TABLE 1

| vGPU profiles | Sorted List of GPU IDs |
|---|---|
| no-profile | (1, 3, 5) |
| P40-1q | (2, 6, 4) |
| P40-2q | (7, 9) |
| P40-3q | (8, 12, 13) |
| P40-4q | (14) |
| P40-6q | (15, 16, 20) |
| P40-8q | (17, 18, 19) |
| P40-12q | (21, 22,) |
| P40-24q | (23, 24) |

Table 1 can provide a list of GPUs 115 for each profile, including GPUs 115 with no-profile. A vGPU-enabled GPU 115 can have no profile if no virtual machines 118 are currently assigned to execute on the vGPU-enabled GPU 115. As a result, no vGPUs 151 need to be maintained or created, and the vGPU-enabled GPU 115 can be open to configuration to any vGPU profile that is supported by the vGPU-enabled GPU 115.

The scheduler 120 can also maintain a data structure that maps each of the GPUs 115 to a number of virtual machines 118 currently executing.

TABLE 2

| GPU IDs | #of VMs running | HOST_IDs |
|---|---|---|
| 1 | 0 | H1 |
| 2 | 11 | H3 |
| 3 | 0 | H4 |
| 4 | 12 | H24 |
| 5 | 0 | H7 |
| 6 | 11 | H9 |
| 7 | 6 | H20 |
| ... | ... | ... |
| 24 | 1 | H2 |

Table 2 shows that the GPU identifier for each vGPU-enabled GPU 115 can be mapped to the number of executing virtual machines, as well as to a host identifier for a host 113.

The scheduler 120 can also determine or identify a maximum number of vGPUs 151 per vGPU-enabled GPU 115, based on its total memory and its vGPU profile. The scheduler 120 can create and maintain a table that includes this information.

TABLE 3

| vGPU Profile | Maximum vGPUs per physical GPU |
|---|---|
| P40-1q | 24 |
| P40-2q | 12 |
| P40-3q | 8 |
| P40-4q | 6 |
| P40-6q | 4 |
| P40-8q | 3 |
| P40-12q | 2 |
| P40-24q | 1 |

Table 3 can be used to identify the maximum number of virtual machines 118 or vGPUs 151 supported for each vGPU profile for a particular type of GPU.

The scheduler 120 can also maintain a data structure that maps each of the GPUs 115 to the vGPU scheduling policy that is configured for its scheduler, as shown in Table 4.

TABLE 4

| GPU IDs | Scheduler |
|---|---|
| 1 | Best Effort |
| 2 | Fixed Share |
| 3 | Equal Share |
| 4 | Equal Share |
| 5 | Fixed Share |
| 6 | Best Effort |
| 7 | Fixed Share |
| ... | ... |
| 24 | Best Effort |

The GPU data 125 can include the information discussed in Tables 1-4.

The scheduler 120 can also work in conjunction with the hypervisor 135 to assign and execute the network functions 119 based on GPUs 115 of the hosts 113. The scheduler 120 can identify GPU requirements for a network function 119. The GPU requirements can include a GPU memory, a GPU type or model, and a GPU processing requirement. The scheduler 120 can identify a vGPU-enabled GPU 115 and schedule the network function 119 to execute in a virtual machine 118 that uses that vGPU-enabled GPU 115. The scheduler 120 can identify the vGPU-enabled GPU 115 in consideration of the GPU requirements as well as network function placement rules 129. Network function placement rules 129 can include network function placement thresholds for resource balancing, efficiency, and cost factors, as well as affinity rules such as affinities and anti-affinities with hosts 113, virtual machines 118, network functions 119 (e.g., chaining), and other requirements.

GPU data 125 can represent information related to GPUs 115, as well as related hardware resources. GPU data 125 can include information such as the amount of GPU memory of the vGPU-enabled GPU 115, a set of supported vGPU profiles for the vGPU-enabled GPU 115, and a GPU configuration status. The GPU configuration status can indicate whether or not the vGPU-enabled GPU 115 is currently configured with a particular vGPU profile. If the vGPU-enabled GPU 115 is configured, the configuration status can also indicate the configured vGPU profile of the vGPU-enabled GPU 115. GPU data 125 can also include information related to the virtual machines 118 currently executing on each vGPU-enabled GPU 115, as well as virtual machines 118 scheduled or slated to be executed. GPU data 125 can include a record of the virtual machines 118 assigned to each vGPU-enabled GPU 115. GPU data 125 can also include vGPUs 151 of the vGPU-enabled GPUs 115. For each vGPU 151, the GPU data 125 can include a GPU memory reservation and availability status. The GPU memory reservation can be an amount of GPU memory of the vGPU 151, according to a configured vGPU profile of the associated vGPU-enabled GPU 115. GPU data 125 can also include a maximum number of virtual machines 118 that are supported by the vGPU-enabled GPU 115 when configured with a particular vGPU profile as discussed.

Virtual machine data 128 can represent information related to virtual machines 118. Virtual machine data 128 can include a record of all network function requests 171 for network functions 119 to be virtualized and executed using the virtual machines 118. A network function request 171 can be triggered based on a packet that is to be transmitted to and processed using a network function 119. The scheduler 120 can determine whether the network function 119 is to be provided using a vGPU-enabled GPU 115, a traditional CPU-based implementation or a vGPU-based implementation. Virtual machine data 128 can include an identifier or name of a virtual machine 118, a list of network functions 119 for that virtual machine 118, and an identifier or location of a vGPU-enabled GPU 115 where the virtual machine 118 is being processed. The virtual machine data 128 can also be considered network function data, since the scheduler 120 can identify the virtual machine 118, host 113, and vGPU-enabled GPU 115 for each network function 119 using this data structure.

The hypervisor 135, which may sometimes be referred to as a virtual machine monitor (VMM), can be an application or software stack that allows for creating and running virtual machines 118, and performing the virtual machines 118 using hardware resources of the computing environment 103. The scheduler 120 can work in conjunction with the hypervisor 135 to execute the virtual machines 118 on hardware resources that include the GPUs 115. A vGPU manager component can be installed and executed in the hypervisor 135 layer and can virtualize the underlying physical GPUs 115 using vGPUs 151. For example, GPUs 115, including NVIDIA® Pascal and others, can offer virtualization for both graphics and GPGPU (CUDA) applications.

A hypervisor 135 can be configured to provide guest operating systems with a virtual operating platform, including virtualized hardware devices or resources, and to manage the execution of guest operating systems within a virtual machine execution space provided on the host machine by the hypervisor 135. In some instances, a hypervisor 135 can be a type 1 or bare metal hypervisor configured to run directly on a host machine in order to control and manage the hardware resources 153. In other instances, the hypervisor 135 can be a type 2 or hosted hypervisor implemented as an application executed by an operating system executed by a host machine. Examples of different types of hypervisors include ORACLE VM SERVER', MICROSOFT HYPER-V®, VMWARE ESX™ and VMWARE ESXi™ VMWARE WORKSTATION™, VMWARE PLAYER™, and ORACLE VIRTUALBOX®.

Figure 2:
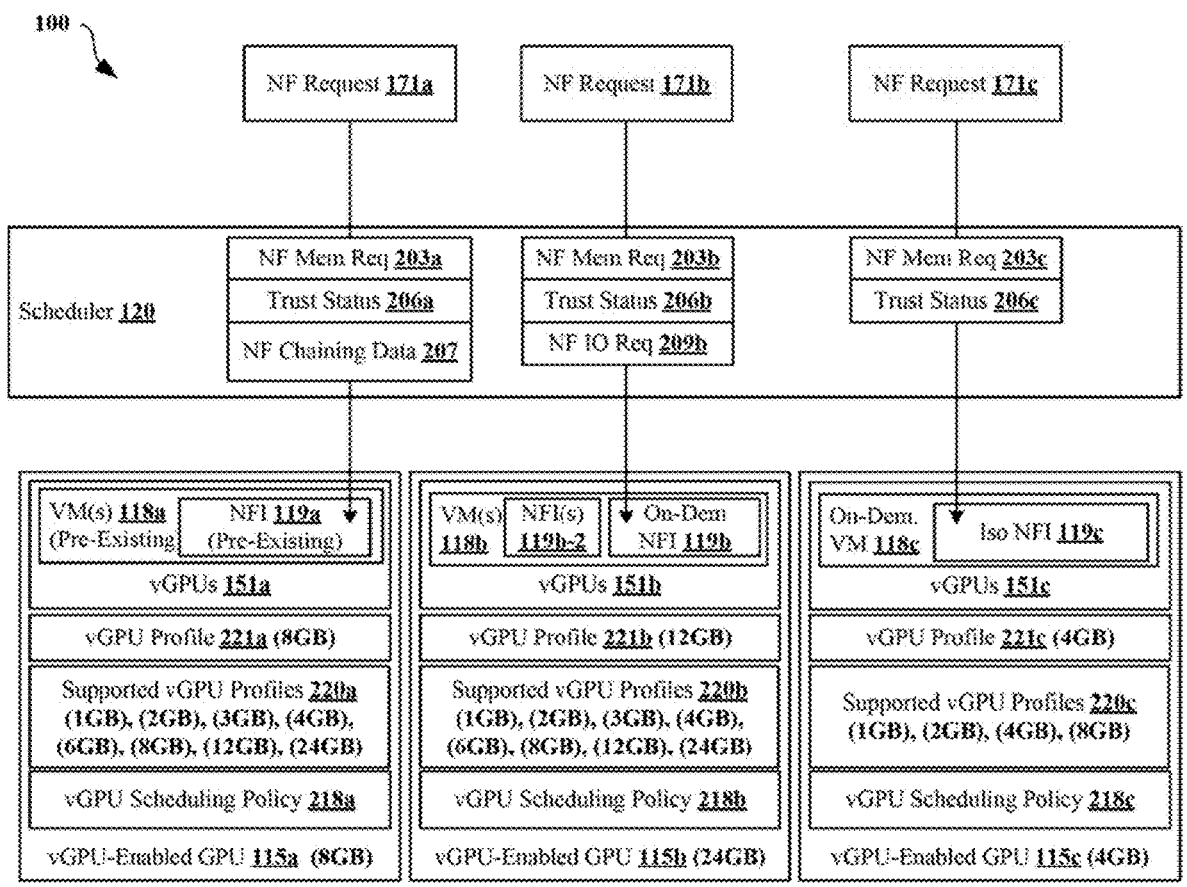
FIG. 2 is a drawing that illustrates an example of functionalities performed using components of the networked environment.

FIG. 2 illustrates an example of the operation of the components of the networked environment 100 of FIG. 1. Generally, the figure illustrates aspects of network function placement in vGPU-enabled environments such as the computing environment 103.

The vGPU-enabled GPU 115a can run its virtual machines 118a according to a vGPU scheduling policy 218a as discussed. The vGPU-enabled GPU 115a can include 24 GB of GPU memory, and can support even divisions of its GPU divisions according to the supported vGPU profiles 220a, including 1 GB, 2 GB, 3 GB, 4 GB, 6 GB, 8 GB, 12 GB, and 24 GB profiles. The vGPU profile 221a that is in use can be an 8 GB profile. The vGPU-enabled GPU 115a can maintain a vGPU 151a in conjunction with a hypervisor vGPU manager component. The scheduler 120 can assign the vGPU-enabled GPU 115a to execute the virtual machines 118a using the vGPU 151a.

The vGPU-enabled GPU 115b can schedule its virtual machines 118b using a vGPU scheduling policy 218b. The vGPU-enabled GPU 115b can include 24 GB of GPU memory, and can support even divisions of its GPU divisions according to the supported vGPU profiles 220b, including 1 GB, 2 GB, 3 GB, 4 GB, 6 GB, 8 GB, 12 GB, and 24 GB profiles. The vGPU profile 221b that is in use can be a 12 GB profile. The vGPU-enabled GPU 115b can maintain a vGPU 151b in conjunction with a hypervisor vGPU manager component. The vGPU-enabled GPU 115b can be assigned to execute the virtual machines 118b using the vGPUs 151b.

The vGPU-enabled GPU 115c can schedule its virtual machines 118c using a vGPU scheduling policy 218c, which can be equal share for this example. The vGPU-enabled GPU 115c can include 24 GB of GPU memory, and can support even divisions of its GPU divisions according to the supported vGPU profiles 220c, including 1 GB, 2 GB, 4 GB, and 8 GB profiles. The vGPU profile 221c that is in use can be an 8 GB profile. The vGPU-enabled GPU 115c can maintain a vGPU 151c in conjunction with a hypervisor vGPU manager component. The vGPU-enabled GPU 115c can be assigned to execute the virtual machines 118c using the vGPUs 151c.

The scheduler 120 can schedule the network function requests 171a, 171b, and 171c. Each of the network function requests 171a-171c can specify or otherwise be associated with a corresponding network function 119, or type of network function that can be implemented using dedicated hardware, a CPU-based virtual implementation, or a vGPU-based virtual implementation. The scheduler 120 can determine which type of implementation to use based on network function placement rules 129. Where a vGPU-based virtual implementation is selected, the scheduler 120 can further identify a particular vGPU-enabled GPU 115, a virtual machine 118, and a network function 119 to handle a network function request 171. The selected virtual machine 118 can be pre-existing, or generated on-demand. The selected network function 119 can be pre-existing, or generated on-demand.

The scheduler 120 can identify a network function request 171 based on a packet to be transmitted. The scheduler 120 can identify a source of the packet, including the geolocation and network address where the packet originates. The scheduler 120 can identify an appropriate network function 119 based on a source, a destination, and other information specified for the packet and the network function request 171.

The scheduler 120 can determine the optimal destination for a packet associated with the network function request 171*a*. The scheduler 120 can identify an appropriate network function 119*a* for the network function request 171*a*. The scheduler 120 can identify a network function memory requirement 203*a*, a trust status 206*a*, and network function chaining data 207 for the network function 119*a*. The scheduler 120 can monitor and analyze virtual machine data 128 and GPU data 125 for the vGPU-enabled GPUs 115*a*, 115*b*, and 115*c*. The scheduler 120 can determine that a vGPU-based implementation is preferable for the network function request 171*a*.

The scheduler 120 can also determine that the network function request 171*a* can be handled using the vGPU-enabled GPU 115*a*. The scheduler 120 can determine that the vGPU-enabled GPU 115*a* is preferable based on the network function chaining data 207. The scheduler 120 can determine that the network function request 171*a* is chained from another network function 119 executed using the vGPU-enabled GPU 115*a*, or that the vGPU-enabled GPU 115*a* is associated with a minimal data transmission and/or replication time. The scheduler 120 can determine that the vGPU-enabled GPU 115*a*, and/or the virtual machine 118*a*, has sufficient available memory by comparing the network function memory requirement 203*a* to a difference between the vGPU profile 221*a* and the vGPU memory usage of the virtual machine 118*a*. The scheduler 120 can also determine that the network function request 171*a* has a trusted trust status 206*a*.

The scheduler 120 can determine the optimal destination for a packet associated with the network function request 171*b*. The scheduler 120 can identify an appropriate network function 119*b* for the network function request 171*b*. The scheduler 120 can identify a network function memory requirement 203*b* and a trust status 206*b* for the network function 119*b*. The scheduler 120 can monitor and analyze virtual machine data 128 and GPU data 125 for the vGPU-enabled GPUs 115*a*, 115*b*, and 115*c*. The scheduler 120 can determine that a vGPU-based implementation is preferable for the network function request 171*b*.

The scheduler 120 can determine that the network function request 171*b* can be handled using the vGPU-enabled GPU 115*b*. The scheduler 120 can determine that the vGPU-enabled GPU 115*b* and/or the virtual machine 118*b* has sufficient available memory equal to or greater than the network function memory requirement 203*b*. Available memory can be determined using the vGPU profile 221*b* and the memory usage of the virtual machine 118*b*. The scheduler 120 can also determine that the network function 119*b* for the network function request 171*b* is trusted based on the trust status 206*b*. The scheduler 120 can determine that the pre-existing network functions 119*b*-2 on the virtual machine 118*b* also have a trusted status. As a result, the scheduler 120 can add the network function 119*b* to the pre-existing virtual machine 118*b*. The scheduler 120 can also determine a network function IO requirement 209*b* of the network function IO requirement 209*b*, and 119*b*, and determine that the host 113 of the vGPU-enabled GPU 115*b* and the virtual machine 118*b* is associated with available IO that is equal to or greater than the requirement in view of current usage. Available IO can be identified using an IO specification of a network device of the host 113 and an average measure or another measure of current IO usage.

The scheduler 120 can determine the optimal destination for a packet associated with the network function request 171*c*. The scheduler 120 can identify an appropriate network function 119*c* for the network function request 171*c*. The scheduler 120 can identify a network function memory requirement 203*c* and a trust status 206*c* for the network function 119*c*. The scheduler 120 can monitor and analyze virtual machine data 128 and GPU data 125 for the vGPU-enabled GPUs 115*a*, 115*b*, and 115*c*. The scheduler 120 can determine that a vGPU-based implementation is preferable for the network function request 171*c*.

The scheduler 120 can determine that the network function request 171*c* can be handled using the vGPU-enabled GPU 115*c*. The scheduler 120 can determine that vGPU-enabled GPU 115*c* and/or virtual machine 118*c* has sufficient available memory to handle the network function request 171*c* based on the network function memory requirement 203*c*, the vGPU profile 221*c*, and the memory usage of the virtual machine 118*c*. The scheduler 120 can also determine that the network function 119*c* for the network function request 171*c* is untrusted based on the trust status 206*c*, so the network function 119*c* should be isolated. The scheduler 120 can generate an isolated network function 119*c* on demand within a virtual machine 118*c*. Here, the virtual machine 118*c* is generated on demand to isolate the network function 119*c*. However, in other cases, an untrusted network function 119*c* can be isolated from trusted network functions by instantiating the untrusted network function 119*c* in a pre-existing virtual machine 118*c* for untrusted network functions 119.

Figure 3:
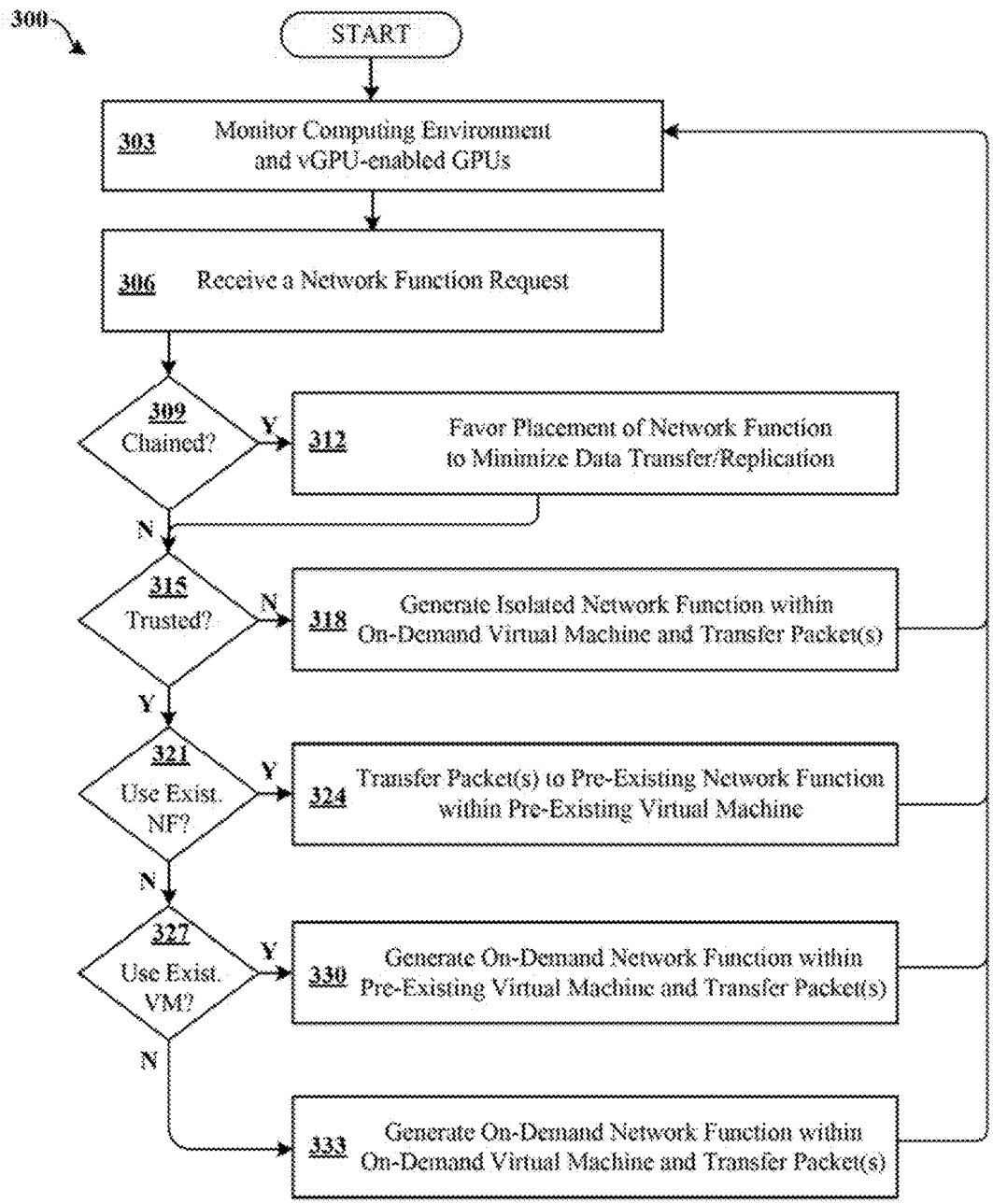
FIG. 3 is a flowchart that illustrates an example of functionalities performed using components of the networked environment.

FIG. 3 shows an example flowchart 300, describing steps that can be performed by instructions executed by the computing environment 103. Generally, the flowchart 300 describes how the scheduler 120 can place network functions 119 for execution in a vGPU-enabled computing environment such as the computing environment 103. While actions are referred to as being performed by the scheduler 120, the steps can include actions performed by other instructions executed in the computing environment 103. Ordering and segmentation of the steps are for example purposes only.

In step 303, the scheduler 120 can monitor the computing environment 103. This can include monitoring the vGPU-enabled GPUs 115, virtual machines 118, and network functions 119 deployed in dedicated hardware, CPU-based implementations, and vGPU-based implementations. The scheduler 120 can, for example, generate and/or access GPU data 125 and virtual machine data 128 as discussed.

In step 306, the scheduler 120 can receive or identify a network function request 171. The network function request 171 can specify or otherwise be associated with a particular network function 119. The scheduler 120 can identify a network function memory requirement 203, a trust status 206, network function chaining data 207, a packet source, and other information about the network function request 171 and the network function 119. In some cases, the scheduler 120 can identify a candidate set of hosts 113, GPUs 115 and/or virtual machines 118 associated with sufficient memory to execute the network function 119. The scheduler 120 can identify the candidate set of hosts 113, GPUs 115 and virtual machines 118 that have sufficient network capacity or IO capacity for an IO requirement of the network function 119. If the network function request 171 or the network function 119 is associated with an affinity or anti-affinity rule, the candidate set of hosts 113, GPUs 115 and virtual machines 118 can be adjusted to comply with these rules.

In step 309, the scheduler 120 can determine whether the network function 119 is chained with another network function 119 that is pre-existing or currently deployed and executing in the computing environment 103. The chained network functions can be a set of network functions 119 that follow one to the next. The network function 119 can be chained with a parent network function 119 or a child network function 119 in the network function chain. If the network function 119 is chained with a pre-existing network function 119, the process can move to step 312, otherwise the process can move to step 315.

In step 312, the scheduler 120 can favor placement of the network function 119 of the network function request 171 to minimize data transfer time. For example, the scheduler 120 can increase goodness scores for candidates that decrease data transfer time, compared to a threshold or average among the set of candidate hosts 113, GPUs 115 and virtual machines 118. The scores for the same host 113 and same vGPU-enabled GPU 115 as the pre-existing network function 119 in the network function chain can also be increased.

In step 315, the scheduler 120 can determine whether the network function 119 for the network function request 171 is trusted. The scheduler 120 can identify a trust status 206 of the network function 119. If the network function 119 is untrusted based on the trust status 206, the process can move to step 318. If the network function 119 is trusted based on the trust status 206, the process can move to step 321.

In step 318, the scheduler 120 can generate an isolated instance of the network function 119 within an on-demand virtual machine 118. The packets or data stream associated with the network function request 171 can then be transmitted to and processed using the network function 119. The instance of the network function 119 can alternatively be generated in a pre-existing virtual machine 118 that is designated for untrusted network functions 119.

In step 321, the scheduler 120 can determine whether to use a pre-existing instance of the network function 119 for the network function request 171. In some cases, the scheduler 120 can increase a goodness score for a pre-existing instance of the network function 119 relative to the other candidates for placement. If the pre-existing instance of the network function 119 is selected for the network function request 171, then the process can move to step 324. Otherwise, the process can move to step 327.

In step 324, the scheduler 120 can cause the packets or data stream associated with the network function request 171 to be transmitted to, and processed using, the pre-existing network function 119 within a pre-existing virtual machine 118.

In step 327, the scheduler 120 can determine whether to use a pre-existing virtual machine 118, even though the pre-existing instance of the network function 119 is not being used. In some cases, the scheduler 120 can increase a goodness score for a pre-existing virtual machine 118 relative to the other candidates for placement. If the pre-existing virtual machine 118 is selected for the network function request 171, then the process can move to step 330. Otherwise, the process can move to step 333.

In step 330, the scheduler 120 can generate and add an on-demand instance of the network function 119 to the pre-existing virtual machine 118. The scheduler 120 can then cause the packets or data stream associated with the network function request 171 to be transmitted to, and processed using, the on-demand instance of the network function 119 in the pre-existing virtual machine 118.

In step 333, the scheduler 120 can generate and add an on-demand instance of the network function 119 within an on-demand virtual machine 118. The scheduler 120 can then cause the packets or data stream associated with the network function request 171 to be transmitted to, and processed using, the on-demand instance of the network function 119 in the on-demand or newly added virtual machine 118.

Figure 4:
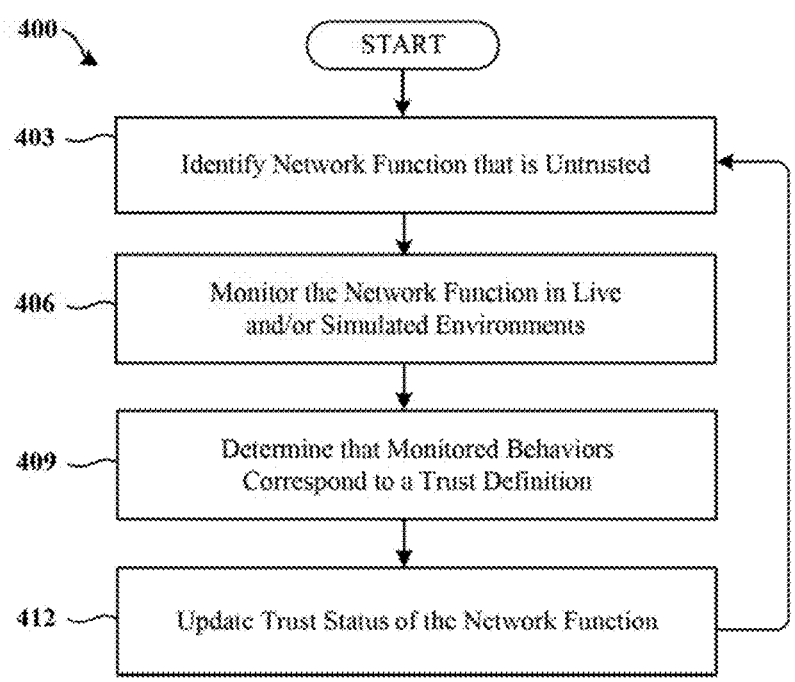
FIG. 4 is a flowchart that illustrates an example of functionalities performed using components of the networked environment.

FIG. 4 shows an example flowchart 400, describing steps that can be performed by instructions executed by the computing environment 103. Generally, the flowchart 400 describes how the scheduler 120 can update a trust status 206 for a network function 119. While actions are referred to as being performed by the scheduler 120, the steps can include actions performed by other instructions or services executed in the computing environment 103. Ordering and segmentation of the steps are for example purposes only.

In step 403, the scheduler 120 can identify a network function 119 that is untrusted. For example, the network function 119 can be from an untrusted or unknown source, such as a custom-written network function 119. The scheduler 120 can confirm that the network function 119 is not included in a table or another data structure that indicates trusted network functions 119, and that the network function 119 is not associated with a set of trusted sources.

In step 406, the scheduler 120 can monitor instances of the network function 119 that are executed in live and/or simulated environments. For example, the scheduling service can allow the usage of the untrusted network function 119 for use by clients and enterprises that are isolated from trusted network functions 119. The scheduler 120 can identify a set of monitored behaviors for the untrusted network function 119 over time.

In step 409, the scheduler 120 can determine that the monitored behaviors for the network function 119 correspond favorably with a trust definition. The trust definition can be included in the network function placement rules 129 for evaluating whether a network function 119 can be associated with a trusted status. The monitored behaviors can be used as inputs to a machine learning algorithm that analyzes CPU usage, network usage, crashes, and other behaviors of the network function 119, and groups the network function 119 with a set of trusted network functions 119, or a set of untrusted network functions. The behaviors can include simulated and live execution of the network function 119 for a predetermined time or predetermined number of transactions. In other cases, the network function placement rules 129 can include threshold values for CPU usage, network usage, crashes, and other behaviors over time.

In step 412, the scheduler 120 can update the trust status 206 of the network function 119 to indicate that the network function 119 is trusted. The scheduler 120 can store the updated trust status 206 in a table or data structure in association with the network function 119. Once the network function 119 is trusted based on its updated trust status 206, the network function 119 can be executed along with other network functions 119 within virtual machines 118 designated for trusted network functions 119.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drives, solid-state drives, USB flash drives, memory cards, optical discs such as compact discs (CDs) or digital versatile discs (DVDs), floppy disks, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The flowchart(s) shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or in machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowchart(s) show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. While aspects of the disclosure can be described with respect to a specific figure, it is understood that the aspects are applicable and combinable with aspects described with respect to other figures. All such modifications and variations are intended to be included herein within the scope of this disclosure.

What is claimed is:

1. A system comprising:
    at least one computing device comprising at least one processor and at least one data store;
    machine readable instructions accessible to the at least one computing device,
        wherein the instructions, when executed by the at least one processor, cause the at least one computing device to at least:
            monitor a virtual graphics processing unit (vGPU)-enabled computing environment comprising a plurality of vGPU-enabled graphics processing units (GPUs);
            identify a network function request associated with a network function, the network function comprising Compute Unified Device Architecture (CUDA) compatible instructions;
            determine to instantiate a vGPU-based implementation of the CUDA compatible instructions to handle the network function request;
            select, in response to the determination to instantiate a vGPU-based implementation of the CUDA compatible instructions to handle the network function request, a vGPU-enabled GPU to handle the network function request, the vGPU-enabled GPU being selected based on at least one of: a network function memory requirement, and a network function IO requirement; and
            process the network function request using an instance of the network function within a virtual machine that is executed using the vGPU-enabled GPU.

2. The system of claim 1, wherein the virtual machine is a pre-existing virtual machine that is not generated on-demand to handle the network function request, and the instance of the network function is a pre-existing instance of the network function that is not generated on-demand to handle the network function request, within the pre-existing virtual machine.

3. The system of claim 1, wherein the instructions, when executed by the at least one processor, cause the at least one computing device to at least:
    generate the instance of the network function as an additional network function instance within the virtual machine, wherein the virtual machine is a pre-existing virtual-machine that is not generated on-demand to handle the network function request, comprising at least one pre-existing network function that is not generated on-demand to handle the network function request.

4. The system of claim 1, wherein the network function is trusted based on a trust status associated with the network function, and the virtual machine is designated for trusted network functions.

5. The system of claim 1, wherein the instructions, when executed by the at least one processor, cause the at least one computing device to at least:
generate the instance of the network function as an additional network function instance within the virtual machine, wherein the virtual machine is an additional virtual machine that isolates the instance of the network function from trusted network functions.

6. The system of claim 1, wherein the network function is untrusted based on a trust status associated with the network function, and the virtual machine is designated for untrusted network functions.

7. The system of claim 1, wherein the network function is part of a network function chain, and the virtual machine is selected to minimize data transfer time for the network function chain.

8. A method performed by at least one computing device executing machine-readable instructions, the method comprising:
monitoring a virtual graphics processing unit (vGPU)-enabled computing environment comprising a plurality of vGPU-enabled graphics processing units (GPUs);
identifying a network function request associated with a network function, the network function comprising Compute Unified Device Architecture (CUDA) compatible instructions;
determining to instantiate a vGPU-based implementation of the CUDA compatible instructions to handle the network function request;
selecting, in response to the determination to instantiate a vGPU-based implementation of the CUDA compatible instructions to handle the network function request, a vGPU-enabled GPU to handle the network function request, the vGPU-enabled GPU being selected based on at least one of: a network function memory requirement, and a network function IO requirement; and
processing the network function request using an instance of the network function within a virtual machine that is executed using the vGPU-enabled GPU.

9. The method of claim 8, wherein the virtual machine is a pre-existing virtual machine that is not generated on-demand to handle the network function request, and the instance of the network function is a pre-existing instance of the network function that is not generated on-demand to handle the network function request, within the pre-existing virtual machine.

10. The method of claim 8, further comprising:
generating the instance of the network function as an additional network function instance within the virtual machine, wherein the virtual machine is a pre-existing virtual-machine that is not generated on-demand to handle the network function request, comprising at least one pre-existing network function that is not generated on-demand to handle the network function request.

11. The method of claim 8, wherein the network function is trusted based on a trust status associated with the network function, and the virtual machine is designated for trusted network functions.

12. The method of claim 8,
generating the instance of the network function as an additional network function instance within the virtual machine, wherein the virtual machine is an additional virtual machine that isolates the instance of the network function from trusted network functions.

13. The method of claim 8, wherein the network function is untrusted based on a trust status associated with the network function, and the virtual machine is designated for untrusted network functions.

14. The method of claim 8, wherein the network function is part of a network function chain, and the virtual machine is selected to minimize data transfer time for the network function chain.

15. A non-transitory computer-readable medium comprising machine readable instructions, wherein the instructions, when executed by at least one processor, cause at least one computing device to at least:
monitor a virtual graphics processing unit (vGPU)-enabled computing environment comprising a plurality of vGPU-enabled graphics processing units (GPUs);
identify a network function request associated with a network function; function, the network function comprising Compute Unified Device Architecture (CUDA) compatible instructions;
determine to instantiate a vGPU-based implementation of the CUDA compatible instructions to handle the network function request;
select, in response to the determination to instantiate a vGPU-based implementation of the CUDA compatible instructions to handle the network function request, a vGPU-enabled GPU to handle the network function request, the vGPU-enabled GPU being selected based on at least one of: a network function memory requirement, and a network function IO requirement; and
process the network function request using an instance of the network function within a virtual machine that is executed using the vGPU-enabled GPU.

16. The non-transitory computer-readable medium of claim 15, wherein the virtual machine is a pre-existing virtual machine that is not generated on-demand to handle the network function request, and the instance of the network function is a pre-existing instance of the network function that is not generated on-demand to handle the network function request, within the pre-existing virtual machine.

17. The non-transitory computer-readable medium of claim 15, wherein the instructions, when executed by the at least one processor, cause the at least one computing device to at least:
generate the instance of the network function as an additional network function instance within the virtual machine, wherein the virtual machine is a pre-existing virtual-machine that is not generated on-demand to handle the network function request, comprising at least one pre-existing network function that is not generated on-demand to handle the network function request.

18. The non-transitory computer-readable medium of claim 15, wherein the network function is trusted based on a trust status associated with the network function, and the virtual machine is designated for trusted network functions.

19. The non-transitory computer-readable medium of claim 15, when executed by the at least one processor, cause the at least one computing device to at least:
generate the instance of the network function as an additional network function instance within the virtual machine, wherein the virtual machine is an additional virtual machine that isolates the instance of the network function from trusted network functions.

20. The non-transitory computer-readable medium of claim 15, wherein the network function is part of a network function chain, and the virtual machine is selected to minimize data transfer time for the network function chain.

* * * * *